J. F. MANNING.
PITCHFORK.
APPLICATION FILED DEC. 15, 1917.
1,292,344.
Patented Jan. 21, 1919.
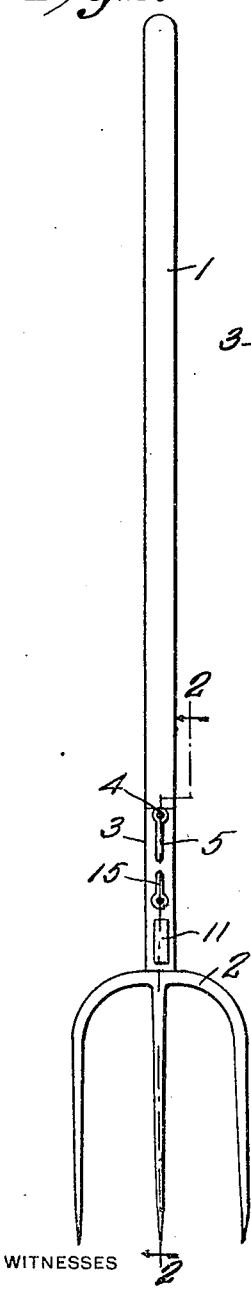
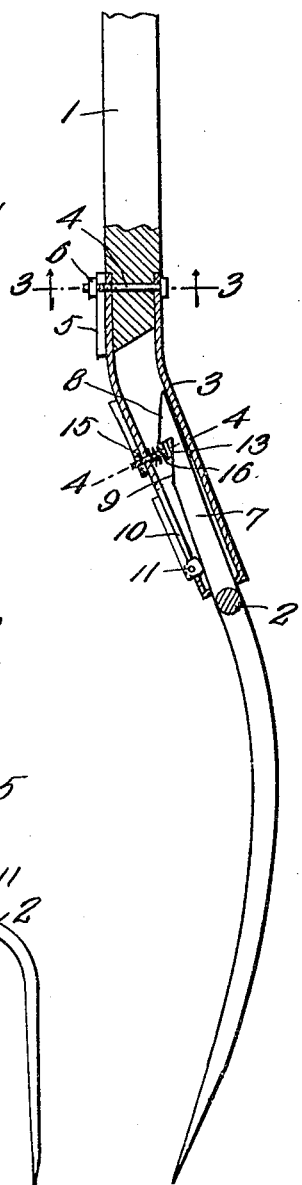
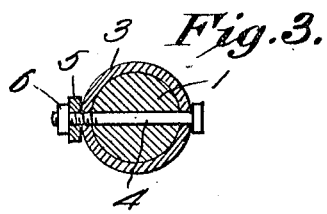
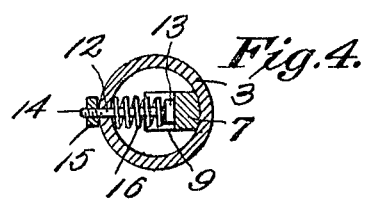
WITNESSES
James F. Crown,
J. P. Campbell.
INVENTOR
James F. Manning,
BY Richard Bowen,
ATTORNEY

UNITED STATES PATENT OFFICE.

JAMES F. MANNING, OF WAUSAU, WISCONSIN.

PITCHFORK.

1,292,344.  Specification of Letters Patent.  Patented Jan. 21, 1919.

Application filed December 15, 1917. Serial No. 207,290.

*To all whom it may concern:*

Be it known that I, JAMES F. MANNING, a citizen of the United States, residing at Wausau, in the county of Marathon and State of Wisconsin, have invented certain new and useful Improvements in Pitchforks, of which the following is a specification.

My invention relates to new and useful improvements in agricultural implements and more particularly to a pitchfork or like implement.

The primary object of the invention is the provision of such an implement having a detachable handle whereby various implements such as pitchforks, hoes, rakes, and the like may be used with one handle.

A further object is the provision of means for securing the implement to the handle.

With these and other objects in view the invention consists in the novel details of construction and arrangement of parts which will be more clearly understood from the following description and drawings, in which—

Figure 1 is a top plan.

Fig. 2 is a longitudinal section on the line 2—2 of Fig. 1.

Fig. 3 is a transverse section on the line 3—3 of Fig. 2, and

Fig. 4 is a transverse section on the line 4—4 of Fig. 2.

In the drawings, the numeral 1 indicates the handle and 2 the implement, which in this instant is a pitchfork, which is adapted to be connected to the handle. A ferrule 3 is secured to one end of the handle 1 and as illustrated, more particularly in Fig. 2 of the drawings, extends downwardly at an angle from the handle and the opposite end is provided with a restricted opening the purpose of which will be presently described. A bolt 4 extends through the ferrule, adjacent one end, and through the handle 1, for securing the ferrule to the handle and a plate 5 having a threaded opening is threaded on the end of the bolt and bears against the ferrule as is more particularly illustrated in Fig. 2 of the drawings. A lock nut 6 is also received on the threaded end of the bolt 4 for holding the plate 5 in position.

A shank 7 is formed on the implement 2 and is adapted to enter the restricted opening in the end of the ferrule. The end of the shank is beveled as indicated at 8 and a notch 9 is formed in the upper surface of the shank adjacent the beveled end 8 for the purpose as will be presently described.

A slot 10 is formed in the ferrule 3, adjacent the lower end thereof, and a cam lever 11 is pivoted in the slot and adapted to engage the upper surface of the shank 7. When in locked position, as illustrated in Fig. 2 of the drawings, the end of the lever will extend longitudinally of the ferrule.

An opening is formed in the ferrule adjacent the end of the slot, and a rod 12 passes through said opening and is provided on the inner end with an enlargement 13 which is adapted to be received in the notch 9 formed in the upper face of the shank 7. The opposite end of the rod 12 is threaded as indicated at 14 and receives the lever 15 which has a threaded opening therein. The opening in the ferrule is of such a diameter as will allow the rod 12 to slide therein. A coiled spring 16 surrounds the rod 12 between the enlarged head 13 and the inner surface of the ferrule.

Having fully described the detailed construction of my device it is thought that the manner of using and the advantages will be clearly understood. While I have described the invention as being applied more particularly to a pitchfork it will be understood that I do not wish to limit myself to such a device but that it could equally as well be used for attaching a hoe, rake, or like implement to the handle. As stated the ferrule is secured to the handle 1 by the bolt 4 passing through the end of the ferrule and the handle and the bolt is held in position by the plate 5 and lock nut 6. When the implement is to be secured to the handle the shank 7 is passed through the restricted end of the ferrule, the cam lever 11 having been swung upon the pivot so that the handle thereof extends at right angles to the ferrule, and the beveled end 8 will raise the rod 12 and enlarged end 13 until the shank passes into such position that the enlargement 13 will drop into the notch 9. The cam lever 11 is then swung upon the pivot so that the cam surface will bear against the upper face of the shank 7 and force the beveled end downwardly, as illustrated in Fig. 2 of the drawings, whereby it will engage the end of the ferrule. When so assembled the enlargement 13, on the rod 12, engaging in the notch 9, will prevent the shank from being withdrawn longitudinally of the ferrule, and the cam lever 11 will prevent the inner end of the shank from being raised, when a load is placed upon the pitchfork. It can also be seen that the tension on the spring 16 may be adjusted by operating the lever 15 which is received upon the threaded end of the rod 12.

Having fully described my invention, what I claim as new and desire to secure by Letters Patent is:

1. A pitchfork having a shank, a handle, a ferrule secured to the handle and having a restricted opening in the end to receive the shank, and a cam lever pivotally connected to the ferrule and adapted to engage the shank for forcing the inner end into engagement with the ferrule.

2. A pitchfork having a shank provided with a notch in the upper surface thereof, a handle, a ferrule secured to and extending beyond one end of the handle, said ferrule having an inwardly extending flange on the outer end forming an opening of less diameter than the ferrule to receive the shank and an elongated opening intermediate the ends, a threaded rod extending through the ferrule intermediate its ends, said rod having an enlarged head on the inner end adapted to be received in the notch in the shank, a coil spring surrounding the threaded rod between the ferrule and enlarged head, a lever carried by the threaded rod on the outside of the ferrule for adjusting the tension of the spring, said lever having a threaded opening adapted to receive the threaded rod, and a cam lever pivoted in the elongated opening in the ferrule and adapted to engage the shank.

In testimony whereof I affix my signature in presence of two witnesses.

JAMES F. MANNING.

Witnesses:
ISABELLE KALK,
C. T. EDGAR.

Copies of this patent may be obtained for five cents each, by addressing the "Commissioner of Patents, Washington, D. C."